United States Patent Office 3,458,629
Patented July 29, 1969

3,458,629
INSECTICIDAL-GERMICIDAL COMPOSITIONS OF QUATERNARY AMMONIUM ORTHO PHENYL PHANATE HALIDE COMPLEXES
Thomas R. Baravalle, Union City, N.J., assignor to Gerdau Chemical Corporation, New York, N.Y., a corporation of New York
No Drawing. Continuation-in-part of application Ser. No. 480,763, Aug. 18, 1965, which is a continuation-in-part of application Ser. No. 440,008, Mar. 15, 1965, which is a continuation-in-part of application Ser. No. 183,735, Mar. 30, 1962, which in turn is a continuation-in-part of application Ser. No. 157,826, Dec. 7, 1961. This application Oct. 23, 1965, Ser. No. 504,059
Int. Cl. A01n 9/02; A61k 27/00
U.S. Cl. 424—187   5 Claims This application is a continuation-in-part and improvement of my copending application Ser. No. 480,763, filed Aug. 18, 1965, now U.S. Patent No. 2,393,194, which in turn is a continuation-in-part of my copending application Ser. No. 440,008, filed Mar. 15, 1965, for Quaternary Phenate Complex Compounds, now abandoned, which, in turn, is a continuation-in-part of my copending application Ser. No. 183,735, filed Mar. 30, 1962, for Quaternary Ammonium Ortho Phenyl Phenate Halide Complexes, now abandoned, which, in turn, is a continuation-in-part of my application Ser. No. 157,826, filed Dec. 7, 1961, for Germicidal Detergent Composition and now abandoned.

This invention relates to new compositions of insecticides and the bactericidal, germicidal and fungicidal compounds of my U.S. patent application Ser. No. 480,763, which compositions have been found to have unexpected synergistic action.

It is accordingly a primary object of the present invention to provide compositions of an insecticide plus a bactericidal, germicidal, fungicidal complex compound, which compositions not only have the bactericidal, germicidal, fungicidal effect of the complex compound plus the insecticidal effect of the insecticidal agent, and not only, quite surprisingly, do not have the effects of either agent reduced, but actually, in the composition of the invention provides improved bactericidal, germicidal, fungicidal and improved insecticidal action.

It is still another object of the present invention to provide water base compositions of the bactericidal, germicidal, fungicidal complex compounds plus insecticides, which compounds provide particularly improved synergistic effects.

Other objects and advantages of my invention will be apparent from a further reading of the specification and of the appended claims.

With the above and other objects in view, the present invention mainly comprises a water base composition, comprising water having distributed therethrough as bactericidal, germicidal, fungicidal agent a quaternary ammonium complex of the formula:

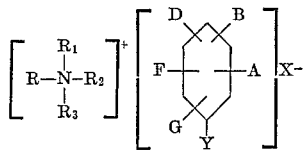

wherein R is selected from the group consisting of alkyl of 8–24 carbon atoms dodecylbenzyl, o-, m- and p-octyl phenoxy ethoxy ethyl, wherein $R_1$ alone is alkyl of up to 24 carbon atoms (preferably lower alkyl such as methyl, ethyl, propyl, butyl or amyl), phenyl, chlorophenyl, bromophenyl, alkyl-phenyl, (preferably lower alkylphenyl), benzyl, alkyl-benzyl (preferably lower alkyl-benzyl such as methylbenzyl, ethylbenzyl, propylbenzyl, butylbenzyl or amylbenzyl), di-alkylbenzyl (preferably di-lower alkyl benzyl such as dimethylbenzyl, diethylbenzyl, dipropylbenzyl, dibutylbenzyl or diamylbenzyl), chlorobenzyl, dichlorobenzyl, bromobenzyl, dibromobenzyl, naphthyl-lower alkyl (preferably naphthyl-methyl or naphthylethyl) and alkyl naphthyl ammonium chloride wherein the alkyl is from 8–24 carbon atoms and is preferably a mixture of $C_{11}$ and $C_{12}$, most preferably $C_{12}$ 98% and $C_{11}$ 2%, wherein $R_2$ alone is lower alkyl (preferably methyl or ethyl), wherein $R_3$ alone is lower alkyl (preferably methyl or ethyl), wherein $R_1$ together with one of the groups $R_2$ and $R_3$ is selected from the group consisting of morpholinyl, methylmorpholinyl and piperidinyl, and wherein $R_1$, $R_2$ and $R_3$ together is selected from the group consisting of pyridinyl, lower alkyl-substituted pyridinyl wherein the lower alkyl is preferably methyl, ethyl, propyl, butyl, or amyl, benzyl-substituted pyridinyl, quinolinyl, and isoquinolinyl, wherein A, B, D and F are each selected from the group consisting of hydrogen, lower alkyl (preferably methyl, ethyl, propyl, butyl or amyl), chlorine, bromine, iodine, phenyl, lower alkyl-phenyl (preferably methyl, ethyl, propyl, butyl or amyl phenyl), lower alkoxy-phenyl (preferably methyloxy, ethyloxy, propyloxy, butyloxy or amyloxy-phenyl), chlorophenyl, bromo phenyl, benzyl, lower alkyl-benzyl, lower alkoxy-benzyl, chlorobenzyl and bromobenzyl, wherein G can be any of the substituents given for A, B, D or F, with the exception of hydrogen, wherein Y is selected from the group consisting of oxygen and sulfur, and wherein X is selected from the group consisting of chlorine, bromine, and iodine, and also having distributed therethrough an insecticidal agent.

According to a preferred embodiment of the invention the composition contains in addition to the quaternary ammonium complex and the insecticidal agent, a wetting agent, which is preferably non-ionic or cationic.

The bactericidal, germicidal, fungicidal quaternary ammonium complexes include all of those disclosed in my copending application Ser. No. 480,763, filed Aug. 18, 1965, and the same can be manufactured according to any of the methods disclosed in said patent application.

The above mentioned complexes are effective against such gram positive organisms as *Staphylococcus pyogenes aureus*, such gram negative organisms as *Salmonella typhosa*, *Salmonella choleraesius*, *Pseudomonas aerugionosa*, and *Proteus vulgaris*, and such spore formers as *Bacillus subtilis*, *Clostribium sprorogenes* and *Aspergillus niger*. Other organisms against which the complexes have been found to be effective include *M. albicans*, *B. proteus*, *S. albus*, bacterial flora, streptococci, *B. mycoides*, and many others, as well as various fungi such as mildew. The complexes have also been found to be effective against Mycobacterium tuberculosis. These complexes do not merely inhibit the growth of the organisms, but actually kill the same.

According to a preferred embodiment of the invention, in order to most simply provide the quaternary ammonium complex in aqueous base, the reaction between the alkali metal or ammonium substituted phenate or thiophenate with the chosen quaternary ammonium halide is carried ou in aqueous medium, and the subsequent halogenation, for example with bromine, is carried out in the aqueous medium. The resulting product is thus already dispersed in aqueous phase, and the composition of this invention can be made by mixing the same with the wetting agent and the insecticide.

It is to be understood that in the compositions of the invention, it is possible to have one or more quaternary ammonium complex compounds, one or more insecticides and one or more wetting agents.

The insecticides which coact synergistically with the quaternary ammonium complexes in the compositions of the present invention include: the pyrethrins, e.g. the pyretholone ester of chrysanthemummonocarboxylic acid and the pyretholone ester of chrysanthemumdicarboxylic acid monomethyl ester; the commonly known D.D.T. which is actually 1,1,1-trichloro-2,2-bis(p-chlorophenyl)ethane; the terpene polychlorinates; dieldrin (which is the common name for an insecticidal product containing not less than 85% of the endo-exo isomer of 1,2,3,4,10,10-hexachloro - 6,7 - epoxy - 1,4,4a,5,6,7,8,8a - octahydro-1,4,5,8-dimethanonaphthalene); malathion; heptachlor; chlordane; and sendane which is 1,2,3,4,5,6-hexachlorocyclohexane. The above mentioned insecticides are effective in the compositions of the present invention against the same insects against which these insecticides can be used alone.

Among the suitable non-ionic wetting agents for the purposes of the present invention are: alkyl phenoxy polyethoxy ethanol wherein the alkyl group can be $C_8$ to $C_{12}$, and polyethoxy can be $(CH_2CH_2O)_4$ to $(CH_2CH_2O)_7$; alkyl phenthiol (the sulfide analog of phenoxy polyethoxy phenol with substantially the same limitations as to alkyl and polyethoxy groups; alkoxy ethoxy ethanol wherein alkoxy is $C_{12}$ to $C_{18}$ and wherein the ethoxy is from 4 to 16 groups; and ethylene oxide condensate of fatty acids wherein the fatty acid may be saturated or unsaturated and preferably contains from 12 to 18 carbon atoms.

Among the suitable cationic wetting agents are: alkyl dimethyl benzyl ammonium halides wherein the alkyl is of 12 to 18 carbon atoms; alkyl amine ethyl oxide condensates wherein the alkyl is of 12 to 18 carbon atoms and the number ethylene oxide groups to form adducts thereof is 8–12; acylamide ethylene oxide condensates wherein acyl is of 12 to 18 carbon atoms and ethylene oxide is 12 to 20 adducts; dialkyl dimethyl ammonium chloride wherein the alkyl is 12 to 18 carbon atoms; alkyl benzyl trimethyl ammonium chloride wherein the alkyl is 12 to 18 carbon atoms; and alkyl-imidazolinium salts.

The amount of the quaternary ammonium complex compound in the compositions of the present invention may vary from as little as 0.01% by weight to as much as 25% by weight. However, since it is unecessary to use very large amounts, as a practical matter the maximum amount of the quaternary ammonium complex should not be more than about 5% by weight. It is most preferred to have amounts of quaternary ammonium complex between about 0.25% by weight to about 2% by weight.

The amount of the insecticide can also vary within very wide limits from as little as 0.025% by weight to as much as 4% by weight, most preferably between about 0.1% by weight to about 0.5% by weight.

The amount of the wetting agent can likewise vary within very wide limits from as little as 0.25% by weight to as much as 10% by weight, most preferably about 1–8% by weight.

The water in the insecticidal-germicidal, bactericidal, fungicidal compositions of the invention can be partially substituted, and in some case fully substituted by alcohol chlorohydrocarbons, petroleum distillate, etc.

The following examples are given to further illustrate the invention. The scope of the invention is not, however, meant to be limited to the specific details of the examples.

EXAMPLE 1

An aqueous dispersion is prepared of the following components in the proportions given:

| | Percent |
|---|---|
| Para-octyl phenoxy ethoxy ethyl dimethyl benzyl ammonium ortho-phenyl phenate bromine complex | 1.75 |
| Triton X–100 (non-ionic wetting agent) | 7.00 |
| Water | 66.271 |
| Petroleum distillate | 24.86125 |
| N-octyl bicycloheptane dicarboximide | 0.06250 |
| Piperonyl butoxide (technical) | 0.03750 |
| Pyrethrin I | 0.01875 |

The above composition is highly effective against insects, bacteria, fungus, etc., and is in fact more effective against the same than is any of the components if used alone.

EXAMPLE 2

A composition is prepared of the following components in the proportions given:

| | Percent |
|---|---|
| Alkyl ($C_8$–$C_{18}$) dimethyl benzyl ammonium ortho-phenyl phenate bromine complex | 1 |
| Octyl phenoxy tetraethoxy ethanol | 8 |
| Water | 70 |
| Petroleum distillate | 18 |
| Pyrethrin II | 1 |
| DDT | 1 |
| Malathion | 1 |

I claim:

1. An insecticidal-germicidal, bactericidal, fungicidal composition, which comprises water having distributed therethrough a quaternary ammonium complex of the formula:

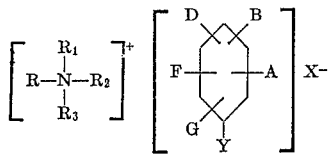

wherein R is selected from the group consisting of alkyl of 8–24 carbon atoms, dodecylbenzyl, octyl phenoxy ethoxy ethyl; wherein $R_1$ alone is selected from the group consisting of alkyl, phenyl, chlorophenyl, bromophenyl, alkylphenyl, benzyl, alkylbenzyl, dialkylbenzyl, chlorobenzyl, dichlorobenzyl, dibromobenzyl, naphthyl-lower alkyl and alkyl naphthyl ammonium chloride wherein the alkyl is from 8–24 carbon atoms, wherein $R_2$ alone is lower alkyl, wherein $R_3$ alone is lower alkyl, wherein $R_1$ together with one of the groups $R_2$ and $R_3$ is selected from the group consisting of morpholino, methylmorpholino and piperidino, and wherein $R_1$, $R_2$ and $R_3$ together is selected from the group consisting of pyridino, quinolino and isoquinolino, wherein A, B, D and F are each selected from the group consisting of hydrogen, lower alkyl, chlorine, bromine, iodine, phenyl, lower alkyl phenyl, lower alkoxy phenyl, chlorophenyl, bromophenyl, benzyl, lower alkyl benzyl, lower alkoxy benzyl, chlorobenzyl and bromobenzyl, wherein G is selected from the group consisting of lower alkyl chlorine, bromine, iodine, phenyl, lower alkyl phenyl, lower alkoxy phenyl, chlorophenyl, bromophenyl, benzyl, lower alkyl benzyl, lower alkoxy benzyl, chorobenzyl and bromobenzyl, wherein Y is selected from the group consisting of oxygen and sulfur, and wherein X is selected from the group consisting of chlorine, bromine and iodine; and an insecticide selected from the group consisting of pyrethrins, DDT, terpene polychlorinates, dieldrin, malathion, heptachlor, chlordane and 1,2,3,4,5,6-hexachlorocyclohexane.

2. An insecticidal-germicidal, bactericidal, fungicidal composition, which comprises water having distributed therethrough a quaternary ammonium complex of the formula:

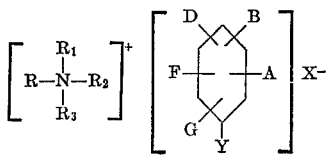

wherein R is selected from the group consisting of alkyl of 8–24 carbon atoms, dodecylbenzyl, octyl phenoxy ethoxy ethyl, wherein $R_1$ alone is selected from the group consisting of alkyl, phenyl, chlorophenyl, bromophenyl, alkylphenyl, benzyl, alkylbenzyl, dialkylbenzyl, chlorobenzyl, dichlorobenzyl, dibromobenzyl, naphthyl-lower alkyl and alkyl naphthyl ammonium chloride wherein the alkyl is from 8–24 carbon atoms, wherein $R_2$ alone is lower alkyl, wherein $R_3$ alone is lower alkyl, wherein $R_1$ together with one of the groups $R_2$ and $R_3$ is selected from the group consisting of morpholino, methylmorpholino and piperidino, and wherein $R_1$, $R_2$ and $R_3$ together is selected from the group consisting of pyridino, quinolino and isoquinolino, wherein A, B, D and F are each selected from the group consisting of hydrogen, lower alkyl, chlorine, bromine, iodine, phenyl, lower alkyl phenyl, lower alkoxy phenyl, chlorophenyl, bromophenyl, benzyl, lower alkyl benzyl, lower alkoxy benzyl, chlorobenzyl and bromobenzyl, wherein G is selected from the group consisting of lower alkyl, chlorine, bromine, iodine, phenyl, lower alkyl phenyl, lower alkoxy phenyl, chlorophenyl, bromophenyl, benzyl, lower alkyl benzyl, lower alkoxy benzyl, chorobenzyl and bromobenzyl, wherein Y is selected from the group consisting of oxygen and sulfur, and wherein X is selected from the group consisting of chlorine, bromine and iodine; an insecticide selected from the group consisting of pyrethrins, DDT, terpene polychlorinates, dieldrin, malathion, heptachlor, chlordane and 1,2,3,4,5,6-hexachlorocyclohexane; and a wetting agent selected from the group consisting of non-ionic and cationic wetting agents.

3. Composition according to claim 2 wherein the wetting agent is non-ionic.

4. Composition according to claim 1 wherein said quaternary ammonium complex is present in an amount of about 0.01% to 25% by weight and said insecticide is present in an amount of about 0.025%–4% by weight.

5. Composition according to claim 2 wherein said quaternary ammonium complex is present in an amount of about 0.01% to 25% by weight, said insecticide is present in an amount of about 0.025%–4% by weight, and said wetting agent is present in an amount of about 0.25%–10% by weight.

References Cited

UNITED STATES PATENTS

| Re. 24,184 | 7/1956 | Sanders. | |
| 2,541,816 | 2/1951 | Glarum | 260—567.5 |
| 2,679,533 | 5/1954 | Darragh | 260—567.5 |
| 2,731,338 | 1/1956 | Fike. | |

FOREIGN PATENTS 614,763   12/1948   Great Britain.

OTHER REFERENCES

Moore, J. Science and Food Agriculture, Oct. 9, 1958, vol. 9, p. 666 relied on.

ALBERT T. MEYERS, Primary Examiner

S. J. FRIEDMAN, Assistant Examiner

U.S. Cl. X.R.

424—190, 213, 248, 258, 263, 267, 278, 329, 352, 354